United States Patent
Reinheimer

(10) Patent No.: US 8,217,092 B2
(45) Date of Patent: *Jul. 10, 2012

(54) MULTICOMPONENT POLYURETHANE/VINYL ESTER HYBRID FOAM SYSTEM AND ITS USE

(75) Inventor: Arne Reinheimer, Irsee (DE)

(73) Assignee: Hilti Aktiengesellschaft, Schaan (LI)

( * ) Notice: Subject to any disclaimer, the term of this patent is extended or adjusted under 35 U.S.C. 154(b) by 881 days.

This patent is subject to a terminal disclaimer.

(21) Appl. No.: 11/998,379

(22) Filed: Nov. 28, 2007

(65) Prior Publication Data

US 2008/0125504 A1 May 29, 2008

(30) Foreign Application Priority Data

Nov. 29, 2006 (DE) .................. 10 2006 056 402

(51) Int. Cl.
*C08G 18/28* (2006.01)

(52) U.S. Cl. ........ 521/130; 521/137; 521/138; 521/139; 521/159; 521/170; 521/172; 521/173; 521/176

(58) Field of Classification Search .................. 521/130, 521/137, 138, 139, 159, 170, 172, 173, 176
See application file for complete search history.

(56) References Cited

U.S. PATENT DOCUMENTS

| | | | |
|---|---|---|---|
| 5,091,436 A | 2/1992 | Frisch et al. | |
| 6,451,430 B1 * | 9/2002 | Smith | 428/423.7 |
| 6,699,916 B2 * | 3/2004 | Lekovic et al. | 521/130 |
| 2002/0052425 A1 | 5/2002 | Kaku et al. | |
| 2003/0087974 A1 * | 5/2003 | Lekovic et al. | 521/99 |

FOREIGN PATENT DOCUMENTS

WO 2006/041559 * 4/2006

OTHER PUBLICATIONS

EP20070022733 Search Report dated Feb. 8, 2008, pp. 1-2.

* cited by examiner

*Primary Examiner* — John Cooney
(74) *Attorney, Agent, or Firm* — Abelman, Frayne & Schwab

(57) ABSTRACT

A multicomponent polyurethane/vinyl ester hybrid foam system for forming a gradient foam with soft and rigid foam regions, with a polyol component (A), a polyisocyanate component (B), and a component (C), which contains a catalyst for the polymerization of the vinyl monomer, with the polyol component (A) containing, as vinyl monomer, a mixture of vinyl esters of at least one polymerizable hydroxyvinyl ester and at least one branched, at least trifunctional, polymerizable vinyl ester, and the polyisocyanate component (B) containing a thermally activatable free radical-forming agent as catalyst for the polymerization of the vinyl monomers, with the proviso that the proportion by weight of the vinyl ester mixture is greater than the proportion by weight of the at least one polyol as well as the proportion by weight of the at least one polyisocyanate.

31 Claims, No Drawings

MULTICOMPONENT POLYURETHANE/VINYL ESTER HYBRID FOAM SYSTEM AND ITS USE

BACKGROUND OF THE INVENTION

1. Field of the Invention

The present invention relates to a multicomponent polyurethane/vinyl ester hybrid foam system for forming a gradient foam with soft and rigid foam regions, as well as to its use as a material for coating surfaces and for filling openings, cable and pipe bushings in walls, floors and/or ceilings of buildings with foam for the purpose of sound insulation and/or fire protection.

2. Description of the Prior Art

Multicomponent polyurethane foam systems for filling openings, cable and pipe bushings in walls, floors and/or ceilings of buildings with foam for the purpose of fire protection are known. The essential task of the polymer matrix of such a foam system is to function as a binder for the actual fire-retardant additives, such as intumescing materials based on an acid-forming agent, a compound supplying carbon and a gas-forming agent or also on expanding graphite, expandable phyllosilicates and/or additional organic or inorganic flame retardants.

Aside from the actual fire protection requirements, such foam systems for fire protection must constantly meet additional requirements, such as an improvement in sound insulation, etc. These requirements must be taken into account essentially by the properties of the polymer binder.

The conventional polyurethane foam systems for filling openings, cable and pipe bushings in walls, floors and/or ceilings of buildings with foam for the purpose of fire protection usually provide a rigid foam. On the other hand, fire protection plugs of soft polyurethane foam are also known for the same purpose; however, they are not foamed on site and instead are fitted into the openings after having been foamed. Rigid foams, based on polyurethane, are advantageous because of their structural advantages, particularly their higher mechanical load-carrying capability. On the other hand, they are less advantageous for sound insulation, since, because of their hardness, they are less suitable for reducing the transfer of sound through solids. On the other hand, soft polyurethane foams have advantages in sound insulation due to their better dampening of the transfer of sound through solids; however, in their mechanical properties, they are inferior to rigid foams. The suppression of shrinkage of the foam during the development of a foamed product can be achieved more easily with rigid foams than with soft foams. Therefore, polyurethane foam systems, which combine the advantages of a soft foam with those of a rigid foam, would be ideal for fire protection as well as for sound insulation.

U.S. Pat. No. 5,091,436 A discloses hybrid rigid foams of polyurethane and unsaturated polyesters, which are used as a wood substitute. Such rigid hybrid foams are produced using polyisocyanates, polyols, catalysts, water as blowing agent and a hydroxyvinyl ester by foaming in a mold. However, because of their rigid foam structure, these rigid hybrid foams are unsatisfactory as sound insulation materials.

Accordingly, it is an object of the present invention to make a polyurethane foam system available for passive fire protection, which has the advantageous mechanical and fire-protection properties of rigid polyurethane foam systems and, at the same time, the better sound insulation properties of soft polyurethane foam systems.

SUMMARY OF THE INVENTION

Applicant has found out that this and other objects of the present invention, which will be come apparent hereinafter, can be achieved by providing a multicomponent polyurethane/vinyl ester hybrid foams system, which, when foamed and cured, provides a rigid polyurethane foam, which has soft and rigid regions and therefore combines the advantageous properties of a rigid foam with the advantageous sound-insulation properties of a soft foam.

According to the invention, there is provided a multicomponent polyurethane/vinyl ester hybrid foam system for forming a gradient foam with soft and hard foam regions, with a polyol component, which contains at least one polyol with a hydroxy functionality of at least 2, a catalyst for the reaction of the polyol with the polyisocyanate, at least one polymerizable vinyl monomer, water, a blowing agent based on a compressed or liquefied gas as foam-forming agent, a polyisocyanate component, which contains at least one polyisocyanate with an NCO functionality of at least 2, and a component, which contains a catalyst for the polymerization of the vinyl monomer, with the polyol, polyisocyanate and catalyst-containing components being kept separated from one another to inhibit reaction, reacting only when mixed with polycondensation and polymerization, which is characterized in that the polyol component contains, as vinyl monomer, a mixture of vinyl esters of at least one polymerizable hydroxy vinyl ester and at least one branched, at least trifunctional, polymerizable vinyl ester and the polyisocyanate component contains a thermally activatable free radical-forming agent as catalyst for the polymerization of the vinyl monomers, with the proviso that the proportion by weight of the vinyl ester mixture is greater than the proportion by weight of the at least one polyol as well as the proportion by weight of the at least one polyisocyanate.

For the specified foaming of the inventive hybrid foams system after the polyol component is mixed with the polyisocyanate component, the thermally activatable free radical-forming agent, present in the reaction mixture, is activated only in the course of the formation of the polyurethane foam by the heat of reaction released and only then initiates the polymerization of the vinyl ester mixture contained in the reaction mixture. Since the reaction mixture has a temperature gradient for this reaction owing to the fact that the heat of reaction, released by the polyurethane reaction, is dissipated more quickly in the outer regions than in the interior of the mixture, the thermally activatable free radical-forming agent is activated only in the interior of the reaction mixture and not in the edge region. As a result, due to the rapid dissipation of heat, the required activation temperature of the free radical-forming agent is not reached in the edge regions. Accordingly, of the reaction mixture in this outer region, only the soft foam portion polyurethane portion of the hybrid foam reacts. On the other hand, in the interior of the mixture, due to the polymerization of the vinyl ester mixture, which takes place simultaneously, a cross-linked vinyl polymer is formed, which leads to rigid regions within the mixture.

In this way, a foam is obtained, which has the properties of a soft foam in the surface region and the properties of a rigid foam in the interior domains or regions, the transition from the rigid domain to the soft domain having a decreasing hardness gradient.

In this way, a foamed product is obtained, which, on the one hand, has the good mechanical strengths of a rigid foam in the core and soft foam regions, advantageous for sound insulation, in the outer regions.

DETAILED DESCRIPTION OF THE PREFERRED EMBODIMENTS

According to the invention, the vinyl ester mixture, contained in the polyol component (A), preferably contains 2-hydroxyethyl (meth)acrylate and/or 2-hydroxypropyl (meth)acrylate and, as branched, at least trifunctional polyester, trimethylolpropane tri(meth)acrylate and/or a trifunctional and higher functional vinyl ester urethane resin.

In the vinyl ester mixture, contained in the polyol component (A) of the inventive hybrid foam system, the ratio by weight of the polymerizable hydroxyvinyl ester to the crosslinked, at least trifunctional, polymerizable vinyl ester preferably is 1:10 to 10:1 and especially 2:5 to 5:1.

In accordance with a further preferred embodiment of the invention, the vinyl ester mixture additionally contains at least one difunctional, polymerizable hydroxyvinyl ester from the group comprising 1,4 butane diol methacrylate, ethoxylated 2-bisphenol A dimethacrylate and hydroxyvinyl ester of the following general formula (1):

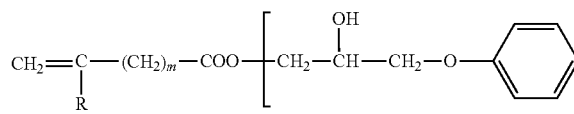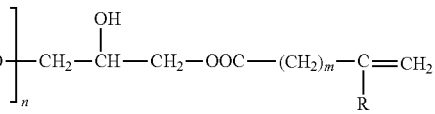

in which R represents hydrogen or a $C_1$-$C_4$ alkyl group, m is 0 or a whole number from 1 to 4 and n is 1 or 2.

In accordance with a further preferred embodiment, the vinyl ester mixture of a polyol component (A) may contain at least one or more additional vinyl monomers, preferably at least one representative of the group comprising the alkyl (meth)acrylates, aryl (meth)acrylates, hydroxyalkyl (meth) acrylamides, ether (meth)acrylates, multifunctional crosslinked (meth)acrylates, vinyl ester urethane resins, alkoxylated bisphenol A dimethacrylates, alkoxylated bisphenol F dimethacrylates, (meth)acrylic acid, (meth)acrylic anhydride and (meth)-acrylonitrile.

Preferably, as additional vinyl monomer of this type, at least one representative of the group comprising the following is a used: methyl (meth)acrylate, ethyl (meth)acrylate, n-butyl (meth)acrylate, isobutyl (meth)acrylate, n-hexyl (meth)acrylate, 2-ethyl hexyl (meth)acrylate, isodecyl (meth) acrylate, (meth)acrylate ester 13,0, (meth)acrylate ester 17,4, cyclohexyl (meth)acrylate, isobornyl (meth)acrylate, benzyl (meth)acrylate, 3,3,5-trimethylcyclohexyl (meth)acrylate, isotridecyl (meth)acrylate, stearyl (meth)acrylate, 2-hydroxyethyl (meth)acrylate, hydroxypropyl (meth)acrylate, 2-dimethylaminoethyl methacrylate, 3-dimethylaminopropyl (meth)acrylamide, 2-trimethylammoniummethyl (meth) acrylic chloride, 3-trimethylammonium-propyl (meth)acrylamide chloride, 2-t-butylaminoethyl (meth)acrylate, (meth) acrylamide, N-methylol (meth)acrylamide, N-butoxymethyl (meth)-acrylamide, ethyltriglycol (meth)acrylate, tetrahydrofurfuryl (meth)acrylate, methoxy(polyethylene glycol 350) (meth)acrylate, methoxy(polyethylene glycol 500) (meth)acrylate, methoxy(polyethylene glycol 750) (meth) acrylate, methoxy(polyethylene glycol 1000) (meth)acrylate, (meth)acrylate esters of ethoxylated (25 mol EO) $C_{16}$-$C_{18}$ fatty alcohol mixtures, butyl diglycol (meth)acrylate, allyl (meth)acrylate, ethylene glycol di(meth)acrylate, diethylene glycol di(meth)acrylate, triethylene glycol di(meth)acrylate, tetraethylene glycol di(meth)acrylate, polyethylene glycol 200 di(meth)-acrylate, polyethylene glycol 400 di(meth) acrylate, polyethylene glycol 600 di(meth)acrylate, polyethylene glycol 1000 di(meth)acrylate, 1,3-butane diol di(meth) acrylate, 1,4-butane diol di(meth)acrylate, 1,6-hexane diol di(meth)-acrylate, 1,12-dodecane diol di(meth)acrylate, glycerin di(meth)acrylate, trimethylolpropane tri(meth)acrylate, diurethane di-(meth)acrylate, reaction products of polyfunctional isocyanate, optionally multihydric alcohol and/or polyamines and a hydroxylalkyl (meth)acrylate, ethoxylated (2 EO) bisphenol A di(meth)acrylate, ethoxylated (10 EO) bisphenol A di(meth)acrylate, (meth)acrylic acid, (meth) acrylic anhydride, mono-2-(meth)acryloyloxyethyl maleate, N-(2-(meth)acryloyloxyethyl)ethylene urea, N-(2-(meth) acryloyloxyethyl)ethylene urea, ethylene cyanhydrin and acetone cyanhydrin and mixtures thereof.

In the chemical nomenclature, employed for the vinyl esters above, " . . . (meth)acrylate" implies that the methacrylate compound in question as well as the acrylate compound is to be included. The expression methyl (meth)acrylate therefore represents methyl methacrylate and methyl acrylate. The corresponding also applies to (meth)acrylic acid derivatives and (meth)acrylamides.

For forming the soft and rigid foam regions in the gradient foam formed with the help of the inventive hybrid foaming system, it is necessary that the proportion by weight of the vinyl ester mixture is greater than the proportion by weight of the at least one polyol as well as the proportion by weight of the at least one polyisocyanate. Preferably, the proportion by weight of the vinyl ester mixture to the proportion by weight of the polyol or polyols is 1.01 to 5.00:1 and especially 1.05 to 3.00:1. The corresponding also applies for the proportion by weight of the vinyl ester mixture to the proportion by weight of the polyisocyanate or polyisocyanates, which also preferably ranges from 1.01 to 5.00:1 and especially from 1.05 to 3.00:1.

Preferably, the thermally activatable free radical-forming agent, which is contained in the polyisocyanate component (B), can be activated thermally at a temperature from 60° to 90° C. and especially from 70° to 80° C. In other words, this means that, upon reaching this temperature in the reaction mixture in the course of the polyurethane formation reaction, the thermally activatable free radical-forming agent then initiates the free radical polymerization of the vinyl monomers contained in the vinyl ester mixture of the polyol component (A).

Pursuant to the invention, preferably a peroxide curing agent, optionally made inert with phthalate ester, chalk, kaolin, silicone oil, an aliphatic material and/or white oil, is used as thermally activatable, free radical-forming agent. The following are particularly suitable pursuant to the invention as peroxide curing agents: di-4-t-butylcyclohexyl peroxydicarbonate, dicetyl peroxydicarbonate, dicyclohexyl peroxydicarbonate, dimyristoyl peroxydicarbonate, t-butyl peroxyneodecanoate, t-amylperoxy pivalate, dilauroyl peroxide, dibenzoyl peroxide, t-amyl peroxy-2-ethylhexanoate, t-butyl peroxy-2-ethylhexanoate, disuccinoyl peroxide, t-amyl peroxy-2-ethylhexylcarbonate, 1,1-di-(t-butylperoxy)-3,3,5-trimethylcyclohexane, 1,1-di-(t-butylperoxy)cyclohexane, t-butyl peroxyisopropylcarbonate, t-butyl peroxy-3,5,5-trimethylhexanoate, t-butyl peroxy-2-ethylhexylcarbonate, t-butyl peroxyacetate, t-amyl peroxybenzoate, t-butyl peroxybenzoate, 2,2-di-(t-butyl peroxy)-butane, dicumyl peroxide, t-butyl cumylperoxide, di-(t-amyl) peroxide, di-(t-butyl) peroxide, t-butyl hydroperoxide, ammonium peroxodisulfate, sodium peroxodisulfate and potassium peroxodisulfate or mixtures of these peroxide curing agents.

In accordance with a particularly preferred embodiment of the invention, the polyol component (A) comprises 5 to 60% by weight and preferably 10 to 50% by weight of at least one polyol, 0.01 to 10% by weight and preferably 0.1 to 5.0% by weight of water as blowing agent, 0.1 to 50% by weight and preferably 0.5 to 40% by weight of at least one polymerizable hydroxyvinyl ester, 0.1 to 50% by weight and preferably 0.5 to 40% by weight of at least one trifunctional, polymerizable vinyl ester, 0 to 50% by weight and preferably 0.5 to 40% by weight of at least one additional vinyl monomer, 0 to 50% by weight and preferably 0.5 to 40% by weight of at least one difunctional, polymerizable hydroxyvinyl ester, 0.01 to 10% by weight and preferably 0.1 to 5.0% by weight of at least one cell stabilizer and 0 to 10% by weight and preferably 0.1 to 5% by weight of at least one catalyst for the reaction of the polyol with the polyisocyanate, the polyisocyanate component (B) contains 1 to 50% by weight and preferably 10 to 40% by weight of at least one polyisocyanate and the component (C) contains 0.01 to 10% the weight and preferably 0.1 to 5% by weight of at least one thermally activatable free radical-forming agent for the polymerization of the vinyl monomer, in each case related to the total weight of the components (A), (B) and (C), the total amount of these components constituting 100% by weight.

In accordance with a further preferred embodiment of the invention, the polyol component (A), as catalyst for the reaction of the polyol with the polyisocyanate, contains an aromatic and/or aliphatic, secondary or tertiary amine, an organometallic compound of a metal of the group comprising Zn, Sn, Mn, Mg, Bi, Sb, Pb and Ca, especially an octoate, a naphthenate or an acetylacetonate.

Moreover, the polyol component (A) as well as the polyisocyanate component (B) may contain at least one intumescing material based on an acid forming agent, a carbon-supplying compound and a gas-forming agent, expanding graphite, an expandable phyllosilicate and/or an additional organic or inorganic flame retardant.

As flame retardant, preferably red phosphorus, a phosphorus compound, especially a halogenated phosphate ester, such as trichloroethyl phosphate, tris(2-chloroisopropyl) phosphate, triphenyl phosphate or tris(2-chloroethyl) phosphate, a metal hydroxide, especially aluminum hydroxide or magnesium hydroxide, zinc borate and ammonium polyphosphate, as well as, optionally, antimony oxide are contained here as synergists.

Pursuant to the invention, the polyol component (A) and/or the polyisocyanate component (B) may contain additionally at least one inorganic filler, such as a metal oxide, a borate, a carbonate, preferably chalk, a silicate, kaolin, glass powder, iron oxide, titanium dioxide, silica, an inorganic foam, preferably foamed, expanded clay, perlite and vermiculite, and/or hollow silicate material or glass spheres.

Finally, the polyol component (A) and/or the polyisocyanate component (B) may additionally contain known adjuvants and additives, stabilizers, plasticizers, catalysts, thixotropic agents, diluents or solvents and/or pigments or dyes in the usual amounts. As thixotropic agents, preferably hydrophobic or hydrophobized silica is used, as diluent or solvent, aliphatic alcohols such as butanol are preferred.

In accordance with a preferred embodiment of the invention, the inventive hybrid foam system is present in the form of a two-component polyurethane/vinyl ester hybrid foam system, for which the component (C) is present separately, to inhibit any reaction, in the polyol component (A) and/or in the polyisocyanate component (B). Preferably, the polyol component (A), the polyisocyanate component (B) and the component (C) are contained separately, to inhibit any reaction, in a two-chamber or multichamber device and, under use conditions, can be caused to react while maintaining the NCO: OH ratio of more than 1:1. A further embodiment of the invention comprises a three-component polyurethane/vinyl ester hybrid foam system, for which the polyol component (A), the polyisocyanate component (B) and the vinyl ester mixture are present in separate chambers of a three-chamber system, the component (C), that is, the catalysts for the polymerization of the vinyl monomers, being either in the polyol component (A) or in the polyisocyanate component (B).

The invention furthermore relates to the use of the inventive multicomponent polyurethane/vinyl ester hybrid foam system for coating buildings and for filling openings and cable and pipe bushings in walls, floors and/or ceilings of buildings with foam for the purpose of sound insulation and/or fire protection.

The following examples are intended to explain the invention further.

Example 1

Polyurethane/Vinyl Ester Hybrid Foam System with a Relatively Small Domain of Soft Foam A two-component polyurethane/vinyl ester hybrid foam system is prepared from the following components:
Polyol Component (A)
(1) Polyol: 29.6% by weight of polyethylene glycol (Pluriol E 600)
(2) Blowing agent: 0.6% by weight of water
(3) Cell stabilizer: 1.0% of a silicone copolymer (DABCO DC 193)
(4) Catalyst for polyurethane reaction: 0.6% by weight of a mixture of 70% bis(2-dimethylamino ethyl ether and 30% dipropylene glycol (Jeffcat ZF-22)
(5) Vinyl ester: 3.0% by weight of hydroxypropyl methacrylate (Bisomer Hpma)
(6) Vinyl ester: 14.8% ethoxylated (2 EO) bisphenol A dimethacrylate (SR 348L)
(7) Vinyl ester: 23.0% by weight of trimethylolpropane trimethacrylate (Bisomer TMPTMA)
Polyisocyanate Component (B):
(8) Polyisocyanate: 26.6% by weight of a pre-polymer based on 4,4'-methylenebis phenyl isocyanate ((Voranate M 220)
Component (C):
(9) thermally activatable free radical-forming agent: 1.0% by weight of dibenzoyl peroxide, made inert with phthalate (BP-50-FT)

For preparing the polyol component (A), the components (1) to (7) are mixed and, for forming the polyisocyanate component (B) containing the component (C), the components (8) and (9) are mixed.

These components may be reacted immediately or also kept separately in different chambers in a two-chamber device to inhibit their reacting with one another.

To prepare the hybrid foam, the polyol component (A) and the polyisocyanate component (B) with the above composition are intimately mixed with one another, whereupon an exothermic polyurethane formation sets in due to the reaction of the polyol with the polyisocyanate. Upon reaching a temperature of about 70° C., the thermally activatable free radical-forming agent is activated and initiates the curing of the vinyl ester component in this temperature range. The hydroxypropyl methacrylate functions as a cross linking site between the two polymeric networks, in that the hydroxy function of this vinyl monomer is incorporated in the polyurethane resin, while the double bond of this vinyl monomer takes part in the free radical polymerization of the vinyl ester mixture. In this way, a hybrid foam with a hardness gradient, decreasing from the inside to the outside, that is, a foam with a rigid core and a soft outer region, is formed.

Example 2

Hybrid Foam System for Preparing a Hybrid Foam with a Relatively Large Soft Foam Domain Polyol Component (A)
(1) Polyol: 24.7% by weight of polyethylene glycol (Pluriol E 600)
(2) Blowing agent: 0.5% by weight of water
(3) Cell stabilizer: 0.8% of a silicone copolymer (DABCO DC 193)
(4) Catalyst for polyurethane reaction: 0.5% by weight of a mixture of 70% bis(2-dimethylamino ethyl ether and 30% dipropylene glycol (Jeffcat ZF-22)
(5) Vinyl ester: 2.5% by weight of hydroxypropyl methacrylate (Bisomer Hpma)
(6) Vinyl ester: 28.8% ethoxylated (2 EO) bisphenol A dimethacrylate (SR 348L)
(7) Vinyl ester: 19.2% by weight of trimethylolpropane trimethacrylate (Bisomer TMPTMA)
Polyisocyanate Component (B):
(8) Polyisocyanate: 22.2% by weight of a pre-polymer based on 4,4'-methylene bis phenyl isocyanate ((Voranate M 220)
Component (C):
(9) thermally activatable free radical-forming agent: 0.8% by weight of dibenzoyl peroxide, made inert with phthalate (BP-50-FT)

A two-component hybrid foam system is prepared according to the procedure given in Example 1.

When foaming and curing, as intended, by mixing the polyol component (A) with the polyisocyanate component (B) containing component (C), a hybrid foam is formed with a relatively large domain of soft foam.

Example 3

The hybrid foam, prepared with the help of the hybrid foam system of Example 1, was compared to a conventional rigid polyurethane foam and a conventional soft polyurethane foam with respect to its sound insulation properties and its mechanical properties.

For this purpose, on the one hand, the improvement in a sound conducted through a hybrid foam, obtained pursuant to the invention, in comparison to a typical rigid polyurethane foam was measured at a frequency of 500 Hz. The values obtained here are listed in the following Table, greater improvements in the structure-borne sound indicating a better uncoupling of this sound.

| Foam Type | Degree of Improvement in Structure-Borne Sound (dB) |
| --- | --- |
| Rigid polyurethane foam | 29.7 |
| Soft polyurethane foam | 57.0 |
| Inventive hybrid foam | 48.2 |

To determine the mechanical properties, the resistance to compression of a typical soft polyurethane foam and of the inventive hybrid foam was measured at a compression of 10% using a cylindrical test sample with a diameter of 27 mm and a height of 33 mm, which had been cut from the foams with the help of a keyhole saw. The resistances to compression are listed in the following Table.

| Foam type | Resistance to Compression (N/mm$^2$) |
| --- | --- |
| Rigid polyurethane foam | 0.150 |
| Soft polyurethane foam | 0.008 |
| Inventive hybrid foam | 0.045 |

It can be seen from the above Table that the inventive hybrid foam system produces a hybrid foam, which is clearly superior to a rigid foam with regard to its sound insulation properties and to a soft foam with regard to its mechanical properties, namely its resistance to compression.

With that, the inventive hybrid foam system is outstandingly suitable as a material for coating surfaces and for filling openings in walls, floors and/or ceilings of buildings with foam for the purpose of sound insulation and fire protection.

Though the present invention was shown and described with reference to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A multicomponent polyurethane/vinyl ester hybrid foam system for forming a gradient foam with soft and rigid foam regions, with
   a polyol component (A), which contains
      at least one polyol with a hydroxy functionality of at least 2,
      a catalyst for the reaction of the polyol with the polyisocyanate,
      a vinyl ester mixture including at least one polymerizable hydroxyvinyl ester and at least one branched, at least trifunctional, polymerizable vinyl ester, and
      water or a blowing agent based on a compressed or liquefied gas as foam-forming agent;
   a polyisocyanate component (B), which contains at least one polyisocyanate with an NCO functionality of at least 2; and
   a component (C), which contains a thermally activatable free radical-forming agent that is activated thermally at a temperature of 60° C. to 90° C. as a catalyst for the polymerization of the vinyl monomer,
   the component (C) present separately from the polyol component (A) and/or the polyisocyanate component (B) to inhibit reaction and reacting only when mixed,
   wherein the proportion by weight of the vinyl ester mixture in the polyol component (A) is greater than the proportion by weight of the at least one polyol in the polyol component (A) as well as the proportion by weight of the at least one polyisocyanate in the polyisocyanate component (B).

2. The multicomponent polyurethane/vinyl ester hybrid foam system of claim 1, wherein the vinyl ester mixture contains,
as hydroxyvinyl ester, 2-hydroxyethyl (meth)acrylate and/or 2-hydroxypropyl (meth)acrylate and,
as branched, at least trifunctional vinyl ester, trimethylolpropane tri(meth)acrylate and/or a trifunctional or higher functional vinyl ester urethane resin.

3. The multicomponent polyurethane/vinyl ester hybrid foam system of claim 1, wherein the ratio by weight of the polymerizable hydroxyvinyl ester to the branched, at least trifunctional, polymerizable vinyl ester in the vinyl ester mixture ranges from 1:10 to 10:1.

4. The multicomponent polyurethane/vinyl ester hybrid foam system of claim 1, wherein the vinyl ester mixture additionally contains a difunctional polymerizable hydroxyvinyl ester from the group comprising 1,4-butane diol methacrylate, ethoxylated 2-bisphenol A dimethacrylate and hydroxyvinyl ester of the following general formula (I):

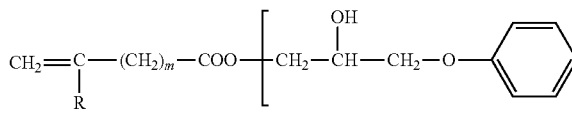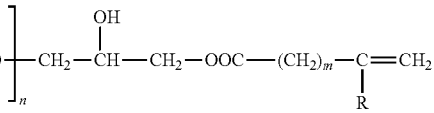

in which R represents hydrogen or a $C_1$-$C_4$ alkyl group, m Is 0 or a whole number from 1 to 4 and n is 1 or 2.

5. The multicomponent polyurethane/vinyl ester hybrid foam system of claim 1, wherein the vinyl ester mixture of a polyol component (A) contains as additional vinyl monomer, at least one representative of the group comprising alkyl (meth)acrylates, aryl (meth)acrylates, hydroxyalkyl (meth)acrylates, (meth)acryl-amides, ether (meth)acrylates, multifunctional cross-linked (meth)acrylates, vinyl ester urethane resins, alkoxylated bisphenol A dimethacrylates, alkoxylated bisphenol F dimethacrylates, (meth)acrylic acid, (meth)acrylic anhydride and (meth)-acrylonitrile.

6. The multicomponent polyurethane/vinyl ester hybrid foam system of claim 5, wherein the vinyl ester mixture of the polyol component (A), as additional vinyl monomer, contains at least one representative of the group comprising methyl (meth)acrylate, ethyl (meth)acrylate, n-butyl (meth)acrylate, isobutyl (meth)acrylate, n-hexyl (meth)acrylate, 2-ethyl hexyl (meth)acrylate, isodecyl (meth)acrylate, (meth)acrylate ester 13,0, (meth)acrylate ester 17,4, cyclohexyl (meth)acrylate, isobornyl (meth)acrylate, benzyl (meth)acrylate, 3,3,5-trimethylcyclohexyl (meth)acrylate, isotridecyl (meth)acrylate, stearyl (meth)acrylate, 2-hydroxyethyl (meth)acrylate, hydroxypropyl (meth)acrylate, 2-dimethylamino ethyl methacrylate, 3-dimethylaminopropyl (meth)acrylamide, 2-trimethylammoniumethyl (meth)acrylic chloride, 3-trimethylammonium-propyl (meth)acrylamide chloride, 2-t-butylaminoethyl (meth)acrylate, (meth)acrylamide, N-methylol (meth)acrylamide, N-butoxymethyl (meth)-acrylamide, ethyltriglycol (meth)acrylate, tetrahydrofurfuryl (meth)acrylate, methoxy(polyethylene glycol 350) (meth)acrylate, methoxy(polyethylene glycol 500) (meth)acrylate, methoxy (polyethylene glycol 750) (meth)acrylate, methoxy(polyethylene glycol 1000) (meth)acrylate, (meth)acrylate esters of ethoxylated (25 mol EO) $C_{16}$-$C_{18}$ fatty alcohol mixtures, butyl diglycol (meth)acrylate, allyl (meth)acrylate, ethylene glycol di(meth)acrylate, diethylene glycol di(meth)acrylate, triethylene glycol di(meth)acrylate, tetraethylene glycol di(meth)acrylate, polyethylene glycol 200 di(meth)-acrylate, polyethylene glycol 400 di(meth)acrylate, polyethylene glycol 600 di(meth)acrylate, polyethylene glycol 1000 di(meth)acrylate, 1,3-butane dial di(meth)acrylate, 1,4-butane diol di(meth)acrylate, 1,6-hexane diol di(meth)-acrylate, 1,12-dodecane diol di(meth)acrylate, glycerin di(meth)acrylate, trimethylolpropane tri(meth)acrylate, diurethane di-(meth)acrylate, reaction products of polyfunktional isocyanate, optionally multihydric alcohol and/or polyamines and a hydroxylalkyl (meth)acrylate, ethoxylated (2 EO) bisphenol A di(meth)acrylate, ethoxylated (10 EO) bisphenol A di(meth)acrylate, (meth)acrylic acid, (meth)acrylic anhydride, mono-2-(meth)acryloyloxyethyl maleate, N-(2-(meth)acryloyloxyethyl)ethylene urea, N-(2-(meth)acryloyloxyethyl)ethylene urea, ethylene cyanhydrin and acetone cyanhydrin.

7. The multicomponent polyurethane/vinyl ester hybrid foam system of claim 1, wherein the ratio by weight of the vinyl ester mixture to the ratio by weight of the at least one polyol and the ratio by weight of the at least one polyisocyanate is 1.01 to 5.00 to 1.

8. The multicomponent polyurethane/vinyl ester hybrid foam system of claim 1, wherein it contains a peroxide curing agent, chalk, kaolin, silicone oil, aliphatic materials and/or white oil, as free radical forming agent, which can be activated thermally for the polymerization of the vinyl monomers.

9. The multicomponent polyurethane/vinyl ester hybrid foam system claim 8, wherein, as peroxide curing agent, it contains at least one representative of the group comprising di-4-t-butylcyclohexyl peroxydicarbonate, dicetyl peroxydicarbonate, dicyclohexyl peroxydicarbonate, dimyristyl peroxydicarbonate, t-butyl peroxyneodecanoate, t-amylperoxy pivalate, dilauroyl peroxide, dibenzoyl peroxide, t-amyl peroxy-2-ethylhexanoate, t-butyl peroxy-2-ethylhexanoate, disuccinoyl peroxide, t-amyl peroxy-2-ethylhexylcarbonate, 1,1-di-(t-butylperoxy)-3,3,5-trimethylcyclohexane, 1,1-di-(t-butylperoxy)cyclohexane, t-butyl peroxyisopropylcarbonate, t-butyl peroxy-3,5,5-trimethylhexanoate, t-butyl peroxy-2-ethylhexylcarbonate, t-butyl peroxyacetate, t-amyl peroxybenzoate, t-butyl peroxybenzoate, 2,2-di-(t-butyl peroxy)-butane, dicumyl peroxide, t-butyl cumylperoxide, di-(t-amyl)peroxide, di-(t-butyl)peroxide, t-butyl hydroperoxide, ammonium peroxodisulfate, sodium peroxodisulfate and potassium peroxodisulfate.

10. The multicomponent polyurethane/vinyl ester hybrid foam system of claim 1, wherein
the polyol component (A) comprises
5 to 60% by weight of at least one polyol,
0.01 to 10% by weight of water as blowing agent,
0.1 to 50% by weight of at least one polymerizable hydroxyvinyl ester,
0.1 to 50% by weight of at least one trifunctional, polymerizable vinyl ester,
0 to 50% by weight of at least one additional vinyl monomer,
0 to 50% by weight of at least one difunctional, polymerizable hydroxyvinyl ester,
0.01 to 10% by weight of at least one cell stabilizer and
0 to 10% by weight of at least one catalyst for the reaction of the polyol with the polyisocyanate, the polyisocyanate component (B) contains 1 to 50% by weight of at least one polyisocyanate and the component (C) contains 0.01 to 10% the weight of at least one thermally activatable free radical-forming agent for the polymerization of the vinyl monomer, in each case related to the total weight of the components (A), (B) and (C), the total amount of these components constituting 100% by weight.

11. The multicomponent polyurethane/vinyl ester hybrid foam system of claim 1, wherein the polyol component (A) contains an aromatic and/or aliphatic, secondary or tertiary amine, an organometallic compound of a metal of the group comprising Zn, Sn, Mn, Mg, Bi, Sb, Pb and Ca, catalysts for the reaction of the polyol with the polyisocyanate.

12. The multicomponent polyurethane/vinyl ester hybrid foam system of claim 1, wherein the polyol component (A) and/or the polyisocyanate component (B) contain at least one intumescing material based on an acid-forming agent, a compound supplying carbon and a gas-forming agent, expanded graphite, an expanding phyllosilicate and/or an additional organic or inorganic flame retardant.

13. The multicomponent polyurethane/vinyl ester hybrid foam system of claim 1, further comprising a flame retardant selected from the group consisting of red phosphorus, a phosphorus compound, a metal hydroxide, zinc borate and ammonium polyphosphate.

14. The multicomponent polyurethane/vinyl ester hybrid foam system of claim 1, wherein the polyol component (A) and/or the polyisocyanate component (B) contain at least one inorganic filler.

15. The multicomponent polyurethane/vinyl ester hybrid foam system of claim 14, wherein the inorganic filler is selected from the group consisting of a metal oxide, a borate, a carbonate, a silicate, kaolin, glass powder, iron oxide, titanium dioxide, silica, an inorganic foam, perlite, vermiculite, a hollow silicate material and glass spheres.

16. The multicomponent polyurethane/vinyl ester hybrid foam system of claim 1, wherein the polyol component (A) and/or the polyisocyanate component (B) additionally contains known adjuvants and additives, stabilizers, plasticizers, catalysts, thixotropic agents, diluents or solvents and/or pigments and dyes in the usual quantities.

17. The multicomponent polyurethane/vinyl ester hybrid foam system of claim 16, wherein hydrophobic or hydrophobized silica is contained as thixotropic material.

18. The multicomponent polyurethane/vinyl ester hybrid foam system of claim 17, wherein an aliphatic alcohol is contained as diluent or solvent.

19. The multicomponent polyurethane/vinyl ester hybrid foam of claim 1, wherein a two-component polyurethane/vinyl ester hybrid foam system is provided, for which component (C) is present separately, to inhibit any reaction, in the polyol component (A) and/or in the polyisocyanate component (B).

20. The multicomponent polyurethane/vinyl ester hybrid foam of claim 1, wherein the polyol component (A), the polyisocyanate component (B) and component (C) are kept separated from one another, to inhibit any reaction, in a two-chamber or multichamber device and, under use conditions, are reacted, an NCO:OH ratio of more than 1:1 being maintained.

21. The multicomponent polyurethane/vinyl ester hybrid foam of claim 1, wherein the gradient foam with soft and rigid foam regions includes a rigid core and soft outer regions.

22. The multicomponent polyurethane/vinyl ester hybrid foam system of claim 1, wherein the ratio by weight of the polymerizable hydroxyvinyl ester to the branched, at least trifunctional, polymerizable vinyl ester in the vinyl ester mixture ranges from 2:5 to 5:1.

23. The multicomponent polyurethane/vinyl ester hybrid foam system of claim 1, wherein the ratio by weight of the vinyl ester mixture to the ratio by weight of the at least one polyol and the ratio by weight of the at least one polyisocyanate is 1.05 to 3.00 to 1.

24. The multicomponent polyurethane/vinyl ester hybrid foam system of claim 1, wherein the polyol component (A) comprises
  10 to 50% by weight of at least one polyol,
  0.1 to 5% by weight of water as blowing agent,
  0.5 to 40% by weight of at least one polymerizable hydroxyvinyl ester,
  0.5 to 40% by weight of at least one trifunctional, polymerizable vinyl ester,
  0.5 to 40% by weight of at least one additional vinyl monomer,
  0.5 to 40% by weight of at least one difunctional, polymerizable hydroxyvinyl ester,
  0.1 to 5.0% by weight of at least one cell stabilizer and
  0.1 to 5% by weight of at least one catalyst for the reaction of the polyol with the polyisocyanate, the polyisocyanate component (B) contains 10 to 40% by weight of at least one polyisocyanate and the component (C) contains 0.1 to 5% by weight of at least one thermally activatable free radical-forming agent for the polymerization of the vinyl monomer, in each case related to the total weight of the components (A), (B) and (C), the total amount of these components constituting 100% by weight.

25. The multicomponent polyurethane/vinyl ester hybrid foam system of claim 11, wherein the organometallic compound is an octoate, a naphthenate or an acetylacetonate.

26. The multicomponent polyurethane/vinyl ester hybrid foam system of claim 13, wherein the flame retardant is a halogenated phosphate ester selected from the group consisting of trichloroethyl phosphate, tris(2-chloroisopropyl)phosphate, triphenyl phosphate and tris(2-chloroethyl)phosphate.

27. The multicomponent polyurethane/vinyl ester hybrid foam system of claim 13, wherein the flame retardant is a metal hydroxide selected from the group consisting of aluminum hydroxide and magnesium hydroxide.

28. The multicomponent polyurethane/vinyl ester hybrid foam system of claim 13, further comprising antimony oxide as a synergist.

29. The multicomponent polyurethane/vinyl ester hybrid foam system of claim 18, wherein the aliphatic alcohol comprises butanol.

30. The multicomponent polyurethane/vinyl ester hybrid foam system of claim 8, wherein the peroxide curing agent is made inert with phthalate.

31. The multicomponent polyurethane/vinyl ester hybrid foam system of claim 14, wherein the inorganic filler is chalk or foamed expanded clay.

* * * * *